US010997395B2

(12) United States Patent
Olgiati

(10) Patent No.: US 10,997,395 B2
(45) Date of Patent: May 4, 2021

(54) SELECTIVE IDENTITY RECOGNITION UTILIZING OBJECT TRACKING

(71) Applicant: Amazon Technologies, Inc., Seattle, WA (US)

(72) Inventor: Andrea Olgiati, Gilroy, CA (US)

(73) Assignee: Amazon Technologies, Inc., Seattle, WA (US)

( * ) Notice: Subject to any disclaimer, the term of this patent is extended or adjusted under 35 U.S.C. 154(b) by 162 days.

(21) Appl. No.: 15/676,015

(22) Filed: Aug. 14, 2017

(65) Prior Publication Data
US 2019/0050629 A1 Feb. 14, 2019

(51) Int. Cl.
G06K 9/00 (2006.01)
G06T 7/20 (2017.01)
G06T 7/00 (2017.01)

(52) U.S. Cl.
CPC ..... *G06K 9/00261* (2013.01); *G06K 9/00221* (2013.01); *G06T 7/0002* (2013.01); *G06T 7/20* (2013.01); *G06T 2207/30201* (2013.01)

(58) Field of Classification Search
CPC ........... G06K 9/00261; G06K 9/00711; G06K 9/4671; G06K 9/00221; G06T 7/20; G06T 7/0002; G06T 2207/30201
See application file for complete search history.

(56) References Cited

U.S. PATENT DOCUMENTS

| | | | | |
|---|---|---|---|---|
| 5,086,480 A * | 2/1992 | Sexton | ............... | G06K 9/00261 348/171 |
| 7,747,157 B2 * | 6/2010 | Sugimoto | .............. | H04N 5/232 396/123 |
| 8,600,106 B1 * | 12/2013 | Parenteau | .......... | G06K 9/00261 382/103 |
| 8,718,337 B1 * | 5/2014 | Syrett | ................ | G06K 9/00288 382/118 |
| 9,176,987 B1 * | 11/2015 | Peng | ..................... | G06K 9/6269 |
| 2005/0265581 A1 * | 12/2005 | Porter | ................ | G06K 9/00295 382/103 |
| 2011/0090344 A1 * | 4/2011 | Gefen | ..................... | G06T 7/248 348/169 |
| 2012/0106806 A1 * | 5/2012 | Folta | .................. | G06K 9/00295 382/118 |
| 2013/0148898 A1 * | 6/2013 | Mitura | ................. | G06K 9/6271 382/195 |
| 2014/0226861 A1 * | 8/2014 | Zhang | .................. | G06K 9/6218 382/103 |
| 2015/0066448 A1 * | 3/2015 | Liu | .......................... | G06T 7/20 703/2 |

(Continued)

OTHER PUBLICATIONS

Zhao et al., "Automatic Tracking of Face Sequences in MPEG Video," Proceedings Computer Graphics International 2003, Jul. 9, 2003, 6 pages.

(Continued)

*Primary Examiner* — Ping Y Hsieh
*Assistant Examiner* — Jose M Torres
(74) *Attorney, Agent, or Firm* — Davis Wright Tremaine LLP

(57) ABSTRACT

Multimedia content may be obtained and an object may be identified in a first frame of video content. The object may be tracked through a plurality of frames, and the object may be identified in a second frame of the video content only if the object is no longer substantially identifiable.

20 Claims, 7 Drawing Sheets

(56) References Cited

U.S. PATENT DOCUMENTS

2015/0317512 A1* 11/2015 Shankaranarayana ........................
G06K 9/00926
382/118
2016/0191856 A1* 6/2016 Huang ................... G06K 9/209
348/159

OTHER PUBLICATIONS

International Search Report and Written Opinion, dated Dec. 14, 2018, International Patent Application No. PCT/US2018/046367, filed Aug. 10, 2018, 12 pages.

* cited by examiner

SELECTIVE IDENTITY RECOGNITION UTILIZING OBJECT TRACKING

BACKGROUND

Multimedia content such as video content is used in multiple settings and presents many difficult challenges in the context of video processing, such as recognizing and identifying objects moving through the multimedia content. Multimedia content often includes large amount of information that make it challenging to process the video to determine, for example, when a particular individual is present in the video. Determining when a particular individual or other object is present in the video may require performing an identity recognition process and it may be computationally infeasible or inefficient to perform repeated identity recognition processes.

BRIEF DESCRIPTION OF THE DRAWINGS

Various techniques will be described with reference to the drawings, in which.

DETAILED DESCRIPTION

Figure 1:
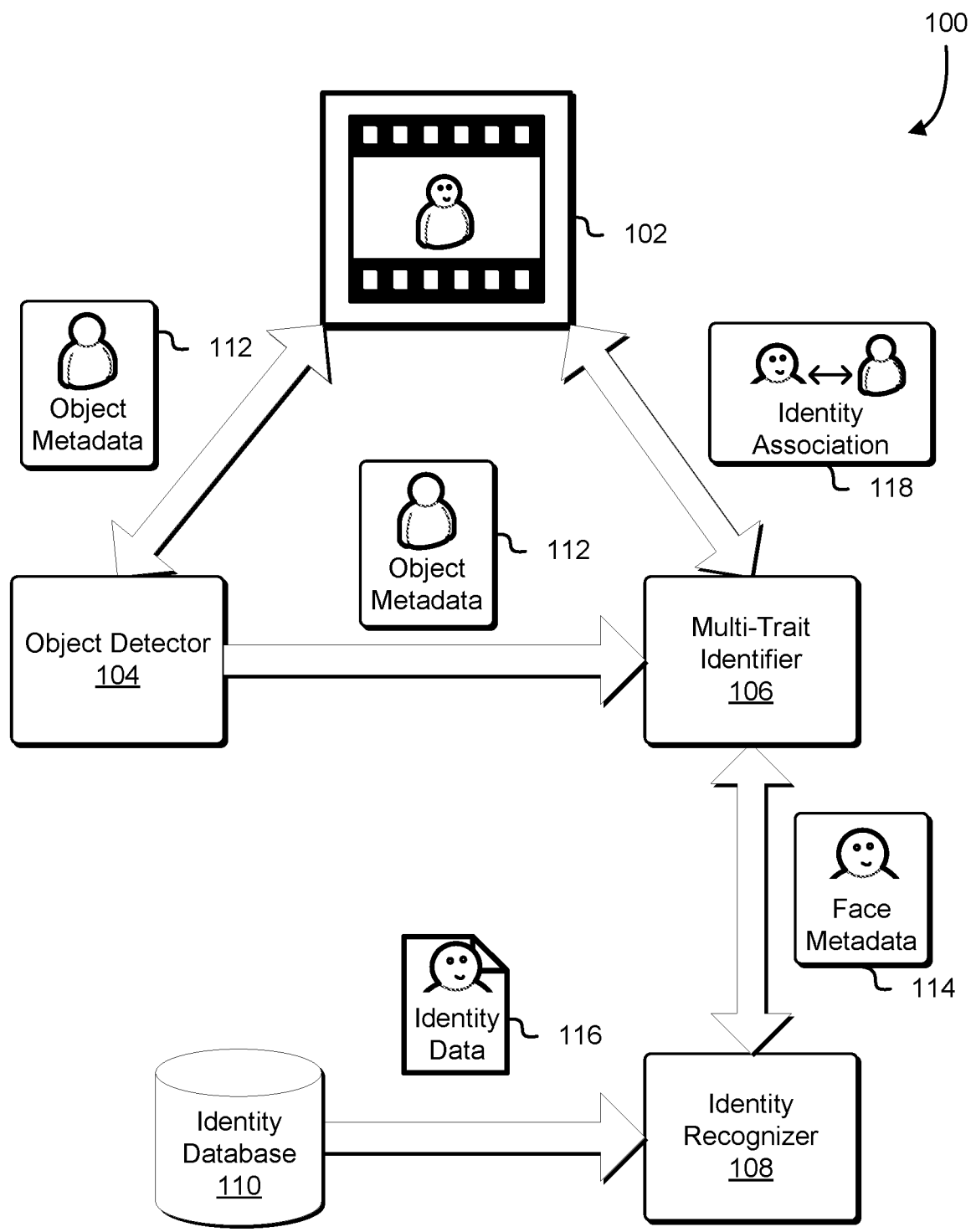
FIG. 1 shows a system in which one embodiment may be practiced.

In an embodiment, objects in videos are identified using multiple traits. In an embodiment, an object detector, a multi-trait identifier, an identity recognizer, and an identity database are configured to track and identify objects detected in multimedia content such as a video. In an embodiment, a person moving through a video is tracked as he or she moves through the video and frames of the video are selected based on criteria that indicate the selected frames can be utilized to perform a recognition process where an identifier can be associated to the person throughout the video, even if the person becomes occluded or leaves the frame for a brief period of time or even for a longer duration of time.

In an embodiment, the object detector is a software component that includes executable code that is executable to receive and ingests multimedia content to generate object tracking metadata such as bounding boxes for individuals moving through a scene, and in some cases, encodes the metadata in association with the multimedia content so that the object metadata is utilized to enhance a viewer's experience of the video, such as in the case of a sporting event where an athlete such as a swimmer can be shown with a bounding box, thereby allowing the viewer to more easily follow the progress of the swimmer through a race. In an embodiment, the multi-trait identifier is a software component that includes executable code that is executable to receive object metadata, such as object tack metadata generated by the object detector and determines whether to perform an identity recognition process for associating a tracked object to an identity, which may be a unique identity. In an embodiment, a multi-trait identifier receives object tracking metadata for one or more tracked objects through a video, obtains information regarding identity association between a tracked object and an identity, determines a confidence score that indicates how likely the tracked object is the identity, and then as a result of determining that a confidence score is below a threshold score or that the object has not been associated with an identity, determines information that can be used as part of a recognition process to associate the tracked object to an identity such as to a particular person.

In an embodiment, the multi-trait identifier determines whether an object is substantially identifiable based on one or more of a set of factors which may be information that is obtainable from object metadata, frames of the video content, or some combination thereof. In an embodiment, an object is substantially identifiable in cases where the object has been identified at one point in time and is successfully tracked through subsequent frames such that there is strong confidence by the tracking system that the same individual is being tracked through the subsequent frames. In an embodiment, whether an object is substantially identifiable is based at least in part on a confidence score which is calculated when the tracked object is associated to an identity and calculated temporally to determine an indication of whether the association may be invalid. In an embodiment, the confidence score falling below a threshold score may indicate a loss in identification of a tracked object.

In an embodiment, the multi-trait identifier receives object metadata, performs a lookup and determines that the object does not have an associated identity or determines that the state of the association is such that an identity recognition process should be performed—in either case, the multi-trait identifier obtains multimedia content corresponding to the frames referenced in the object metadata and selects one or more frames to provide to an identify recognizer where the frames are selected based on various factors which are based at least in part on the algorithm used by the identity recognizer to recognize identities. In an embodiment, facial data such as a person's facial features including but not limited to eye, nose, mouth, ear, and jaw data is utilized to determine the identity of an object that is a person—as such, the multi-trait identifier selects frames in which a person to be identified has an orientation that is facing forward or lateral to the view of the video. In an embodiment, an individual's orientation is determined based on detecting whether the bounding box of the individual or a bounding box of the individual's head is shrinking in size—in such a case, it is inferred that the person is moving away from the view of the video and it is likely that the individual is facing away from the video and the multi-trait identifier determines that other frames are more suitable for providing to an identity recognizer which utilizes facial data to determine the identity of an individual. In some cases, frames are selected based on determinations that the individual to be identified is facing towards the video or lateral to the video such that some or all facial features are determined to be visible in the frame, for example, based on the bounding box of the individual or the individual's head being determined to be growing in size or the same or approximately the same size between frames.

In an embodiment, the multi-trait identifier includes executable code that is executable to receive identity data in response to a request to identify an object and associates the identity data to a tracked object of the multimedia content and further generates identity association metadata in connection with the multimedia content. In an embodiment, the identity association metadata is embedded directly into the multimedia content (e.g., in a data file or data structure that was created with the multimedia content), encoded in existing metadata associated with the multimedia content (e.g., stored as an extension to an existing manifest file), stored separately from and in association with the multimedia content (e.g., as a metadata that can be accessed separately from the multimedia content), and more. In an embodiment the multi-trait identifier generates and track identity association metadata for multiple object through a video or portions of a video and generates a list of identities that appeared, the times that they were present and additional information such as any actions performed by the individuals and whether the individual cross paths with or was occluded by another individual.

In an embodiment, the identity recognizer is a software component that includes executable code that is executable to receive face metadata which includes frames of a video and utilize an identity recognition process to determine an identity of an object in the frames. In an embodiment, the identity recognizer receives a request to identify an object, the request including face metadata having one or more frames of a video which the identity recognizer can evaluate against a set of known identities which is accessible via an identity database by utilizing various face detection and face recognition algorithms. In an embodiment, the identity recognizer receives face metadata such a bounding box around an individual to be identified and/or a bounding box around the head of the individual to be identified and the corresponding video frames in which the bounding boxes surrounds the individual to be identified, performs an identity recognition process using face detection and/or face recognition techniques that matches the individual to an identity of a set of identities which is obtained from an identity database, and returns the identity data to the multi-trait identifier. In an embodiment, the face detection and/or face recognition techniques utilized has a higher likelihood of matching the received metadata to an identity if there are facial features visible such as eyes, nose, mouth, etc. which distinguishes one individual from another, whereas other information such as hair color may be less helpful in distinguishing between multiple individuals that share the same or similar hair color.

In an embodiment, a process for selectively performing an identity recognition process based on object tracking metadata is implemented using hardware, software, or a combination thereof which, for example, is implemented by a multi-trait identifier. In an embodiment, a system such as a multi-trait identifier receives object tracking metadata which includes data regarding the location of the tracked object (e.g., data such as coordinates for a bounding box around the object), the direction and velocity of the tracked object, whether the object is partially or wholly occluded, and other metadata that is usable to determine a confidence score of an identity associated to the object or evaluate an association state, such as described elsewhere in connection with other figures. In an embodiment, the system determines whether there is an identity association data entry associated with the tracked object by querying a mapping (e.g., an unordered map having key values that associate a tracked object to identity data) and if there is no identity data associated with the tracked object, identifies the object such as in the manner described later in connection with this figure, whereas if there does exist identity data associated with the tracked object, the identity association information is updated, for example by evaluating a confidence score or an association state such as in the manner described elsewhere in this disclosure.

In an embodiment, the system determines whether to re-identify the tracked object based by evaluating received object metadata and perhaps additional data such as previously received object metadata which is used to generate a confidence score as discussed below. In an embodiment, a confidence score that is below a threshold value indicates that an object should be re-identified or a change to a particular association state (e.g., stale state, overlap state, occluded state) indicates that an object is substantially unidentifiable or that a loss in identification of the object has occurred, and that an identity recognition process should be performed. In an embodiment, if the system determines that a recognition should be performed, the system select one or more frames of multimedia content from multimedia that the object tracking metadata is derived from. In an embodiment, the frames of multimedia content are selected based on multiple factors including a determination of whether facial data is likely to be included in the particular frames, which is determined by identifying a bounding box around the head of the individual to be identified and determining whether the bounding box tracking the head of the individual is growing in size, shrinking in size, or relatively stable in size (e.g., the change in size of a bounding box around a head is within a small percentage change). In an embodiment, other information can be utilized to determine which frames to select, such as detecting a uniform (so as to identify the individual to a particular group, such as a law enforcement officer or a member of a sports team).

Figure 2:
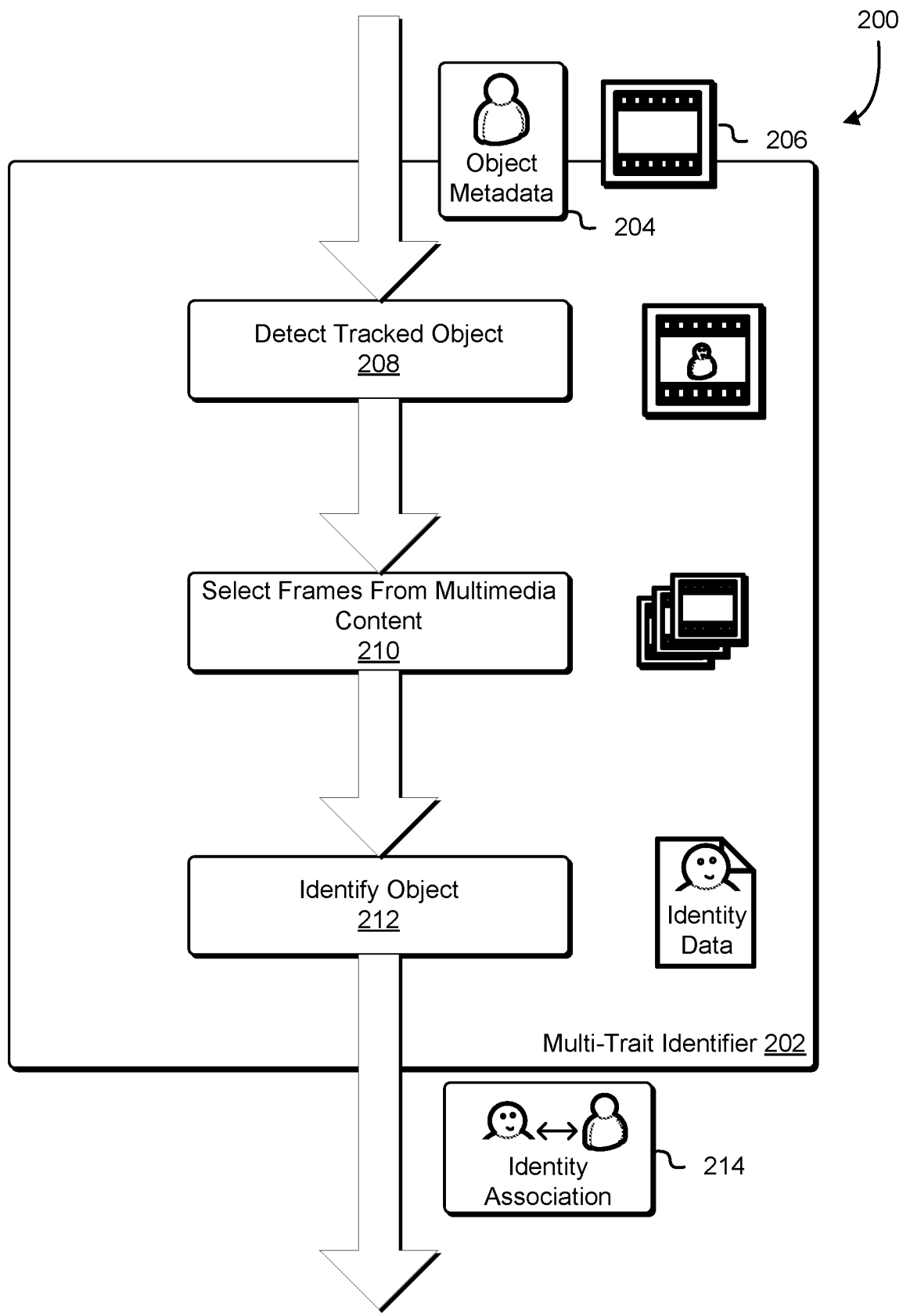
FIG. 2 shows one embodiment in which a multi-trait identifier generates identity association information.

In an embodiment, the system will identify the tracked object by performing an identity recognition process or delegate the performance of the identity recognition process to another component by providing the selected frames and obtain identity data regarding the tracked object, such as information pertaining to who the individual being tracked is (e.g., the name or other identifying information of an individual being tracked) to perform identity recognition processes that are in accordance with those described elsewhere in this disclosure, such as in connection with FIGS. 1 and 2 below.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

In an embodiment, FIG. 1 is an illustrative example of a system 100 that includes multimedia content 102, an object detector 104, a multi-trait identifier 106, an identity recognizer 108, and an identity database 110 which are configured such that the components shown in FIG. 1 are utilized to perform various functions in accordance with this disclosure such as utilizing object metadata to selectively perform recognition methods to identify objects shown in multimedia content 102. In an embodiment, a person moving through a video is tracked as he or she moves through the video and frames of the video are selected based on criteria that indicate the selected frames can be utilized to perform a recognition process where an identifier can be associated to the person throughout the video, even if the person becomes occluded or leaves the frame for a brief period of time or even for a longer duration of time.

In an embodiment, multimedia content 102 refers to video or visual content that is represented by series of frames over time, such as a movie or a visual broadcasting or recording. In an embodiment, the multimedia content 102 includes multiple frames which can be played at various rates to generate video playback on a video playback device. In an embodiment, examples of multimedia content include a movie, television show programming, a home video recorded on a camcorder, and more. In an embodiment, the multimedia content 102 includes multiple objects such as people that move through the video in various settings such that at some point, the people cross paths with each other from the viewpoint of the video, the people are occluded from the video (e.g., by another object such as a truck passing in front of the person) or people may simply walk out of view of the video.

In an embodiment, the object detector 104 is a software component that includes executable code that is executable to receive multimedia such as the multimedia content 102 shown in FIG. 1 as an input and track objects in the multimedia. In an embodiment, object tracking refers to locating and following a moving object of a video over a period of time. In an embodiment, the object detector 104 receives multimedia input and track one or more objects that move through the multimedia input over time by detecting a particular object in one frame and determining the location of the same object in a subsequent frame, thereby generating metadata regarding the object. In an embodiment, the object detector 104 ingests multimedia content, generates object metadata such as bounding boxes for people moving through a scene, and encodes the metadata in association with the multimedia content so that the object metadata is utilized to enhance a viewer's experience of the video, such as in the case of a sporting event where an athlete such as a swimmer can be shown with a bounding box, thereby allowing the viewer to more easily follow the progress of the swimmer through a race.

In an embodiment, the multi-trait identifier 108 is a software component that includes executable code that is executable to receive object metadata, such as the object metadata 112 generated by the object detector 104 as illustrated in FIG. 1, and determine, in connection with information regarding the multimedia content, whether and when and how to perform processes for performing a recognition process for associating a tracked object to an identity, which may be a unique identity such as associating a tracked object to an individual, or a non-unique identifier, such as associating a tracked object to a classification (e.g., a tracked individual can be associated to a particular profession such as a law enforcement office based on visual cues such as a uniform being worn by the individual). In an embodiment, a multi-trait identifier 106 receives object tracking metadata 112 for one or more tracked objects through a video, obtains information regarding identity association between a tracked object and an identity, determines a state of the associated based on the received object metadata such as whether the object is still visible (e.g., whether the object has been occluded) which in some cases includes a confidence score that indicates how likely the tracked object is the identity, and then as a result of determining that a confidence score is below a threshold score or that the object has not been associated with an identity, determines information that can be used as part of a recognition process to associate the tracked object to an identity such as to a particular person. In an embodiment, the multi-trait identifier 106 includes code that is executable to determine that a confidence score encoded in object metadata of an object being tracked has fallen below a threshold score, thereby indicating that the identity of the tracked object may be in question or that the object is no longer substantially identifiable, determine one or more conditions that indicate that an identity recognition process should be performed, and provide information associated with the tracked object, such as the object metadata and one or more frames of data that the object metadata is linked to, to an identity recognizer 108 that can be utilized to determine an identity associated with the tracked object.

In an embodiment, the multi-trait identifier 106 includes executable doe that is executable to determine whether an object is substantially identifiable based on one or more of a set of factors which may be information that is obtainable from object metadata, frames of the video content, or some combination thereof. In an embodiment, an object is substantially identifiable in cases where the object has been identified at one point in time (e.g., based on a set of frames at a first point in time) and is successfully tracked through subsequent frames such that there is strong confidence by the tracking system (e.g., the object detector 104 shown in FIG. 1) that the same individual is being tracked through the subsequent frames. In an embodiment, whether an object is substantially identifiable is based at least in part on a confidence score which is calculated when the tracked object is associated to an identity and calculated temporally to determine an indication of whether the association may be invalid. In an embodiment, the association between an identity and a tracked object can have multiple states—a "good" state that corresponds to where there is high confidence in the identity of the tracked object, an "unknown" state where there is no available information as to the identity of a tracked object (e.g., in cases where an object has been tracked but no identity recognition process has been run on the object yet), and various other states such as a "stale" state where, after the passage of a possibly predetermined period of time, that an object is to be re-identified even if there is high confidence in the identity of the tracked object, and a "verify" state where a confidence score has fallen below a threshold score indicating that there is not a high confidence in the identity of the tracked object and that an identity recognition process should be performed on the tracked object. In an embodiment, a loss of identification in an object may refer to the confidence score associated with a tracked object falling below a threshold score, may refer to the state of a tracked object changing from one state to another (e.g., a change from a "good" state to a "unknown" state), and more—generally speaking, a loss of identification may refer to the detection of an event or condition that indicates that an object (e.g., a person) should be re-identified, such as detecting that the object was occluded, that a bounding box tracking the object overlapped with the bounding box of another tracked object, and various other kinds of events and conditions.

In an embodiment, the multi-trait identifier 106 includes executable code that is executable to detect that an identity recognition process should be performed, such as in response to detecting a particular state as in regard to the association between an identity and a tracked object, determines information to be provided to an identity recognizer 108 such as select frames of video, provides the information to the identity recognizer 108, and receives, in response, an identifier or identity data based on the information provided. In an embodiment, the multi-trait identifier 106 includes executable code that is executable to receive object metadata and perform a lookup to determine whether the corresponding object has an associated identity. In an embodiment, the lookup is performed using a suitable data structure, such as a map, an unordered map, a vector, a list, an array, and more—for example, in the case of an unordered map, the key value can be an identifier associated with the identity and the mapped value can be a reference (e.g., a pointer) to the corresponding object metadata for that identity.

In an embodiment, the multi-trait identifier 106 receives object metadata, perform a lookup and determine that the object does not have an associated identity or determine that the state of the association is such that an identity recognition process should be performed—in either case, the multi-trait identifier 106 includes executable code that is executable to obtain multimedia content 102 corresponding to the frames referenced in the object metadata and select one or more frames to provide to an identify recognizer 108 where the frames are selected based on various factors which are based at least in part on the algorithm used by the identity recognizer to recognize identities. In an embodiment, facial data such as a person's facial features including but not limited to eye, nose, mouth, ear, and jaw data is utilized to determine the identity of an object that is a person—as such, the multi-trait identifier 106 selects frames in which a person to be identified has an orientation that is facing forward or lateral to the view of the video. In an embodiment, an individual's orientation is determined based on detecting whether the bounding box of the individual or a bounding box of the individual's head is shrinking in size—in such a case, it is inferred that the person is moving away from the view of the video and it is likely that the individual is facing away from the video and the multi-trait identifier 106 includes executable code that is executable to determine that other frames are more suitable for providing to an identity recognizer which utilizes facial data to determine the identity of an individual. In some cases, frames are selected based on determinations that the individual to be identified is facing towards the video or lateral to the video such that some or all facial features are determined to be visible in the frame, for example, based on the bounding box of the individual or the individual's head being determined to be growing in size or the same or approximately the same size between frames.

In an embodiment, the multi-trait identifier 106 includes executable code that is executable to receive an identifier or identity data 116 in response to a request to identify an object and associates the identifier or identity data 116 to a tracked object of the multimedia content 102 and further generates identity association metadata 118 in connection with the multimedia content 102. In an embodiment, the identity association metadata 118 is embedded directly into the multimedia content (e.g., in a data file or data structure that was created with the multimedia content 102), encoded in existing metadata associated with the multimedia content (e.g., stored as an extension to an existing manifest file), stored separately from and in association with the multimedia content 102 (e.g., as a metadata that can be accessed separately from the multimedia content 102), and more. In an embodiment the multi-trait identifier 106 generates and track identity association metadata for multiple object through a video or portions of a video and generates a list of identities that appeared, the times that they were present (i.e., tracked), and additional information such as any actions performed by the individuals and whether the individual cross paths with or was occluded by another individual.

In an embodiment, the identity recognizer 108 is a software component that includes executable code that is executable to receive face metadata 114 which includes frames of a video and utilize an identity recognition process to determine an identity of an object in the frames. In an embodiment, the identity recognizer 108 includes executable code that is executable to receive a request to identify an object, the request including face metadata 114 having one or more frames of a video which the identity recognizer 108 can evaluate against a set of known identities which is accessible via an identity database 110 shown in FIG. 1 by utilizing various face detection and face recognition algorithms. In an embodiment, the identity recognizer 108 includes executable code that is executable to receive face metadata 114 such a bounding box around an individual to be identified and/or a bounding box around the head of the individual to be identified and the corresponding video frames in which the bounding boxes surrounds the individual to be identified, performs an identity recognition process using face detection and/or face recognition techniques that matches the individual to an identity of a set of identities which is obtained from an identity database 110, and returns the identity data 116 to the multi-trait identifier 106. In an embodiment, the face detection and/or face recognition techniques utilized has a higher likelihood of matching the received metadata to an identity if there are facial features visible such as eyes, nose, mouth, etc. which distinguishes one individual from another, whereas other information such as hair color may be less helpful in distinguishing between multiple individuals that share the same or similar hair color.

In an embodiment, an identity store 110 includes executable code that is executable to store data of known identities and features related to those identities. In an embodiment, an identity refers to a unique individual but in other cases it refers to a group or classification, such as a firefighter who is identifiable based on a particular uniform, or a member of a sports team where the team is identifiable based on a jersey or uniform that is worn by such members of a sports team. In an embodiment, features or feature information is mapped to identities, such as facial data of an individual's eye, nose, mouth, jaw, and other face information. In an embodiment, the identity store 110 includes executable code that is executable to store data in a database, a hard disk drive, a network attached storage (NAS) drive, and other such examples of storage system and the identity recognizer 108 can access the identity store 110 via a set of application programming interface (API) calls. In an embodiment, the identity store 110 is accessed via a web service API call where the identity recognizer 108 submits web API calls to a frontend service which in turn routes the requests to a backend service having access to the identity store 110.

In an embodiment, FIG. 2 is an illustrative example of a system 200 that includes a multi-trait identifier 202 configured to generate identity association data 214. In an embodiment, the multi-trait identifier 202 is in accordance with those described elsewhere in connection with FIG. 1. In an embodiment, the multi-trait identifier 202 is a software module that includes executable code that is executable to receive object metadata 204 and multimedia content 206 referenced by the object metadata 204 such as in cases where the object metadata 204 indicates the coordinates of a bounding box at one or more particular frames of the video of the multimedia content 206. In an embodiment, the object metadata is generated by an object detector that tracks the movement of objects in a video over time, generates object metadata for the tracked objects, and provides the object metadata 204 to the multi-trait identifier 202. The multimedia content 206 includes visual information that is encoded in a set of visual frames which can be played back as video when presented in sequence.

Figure 4:
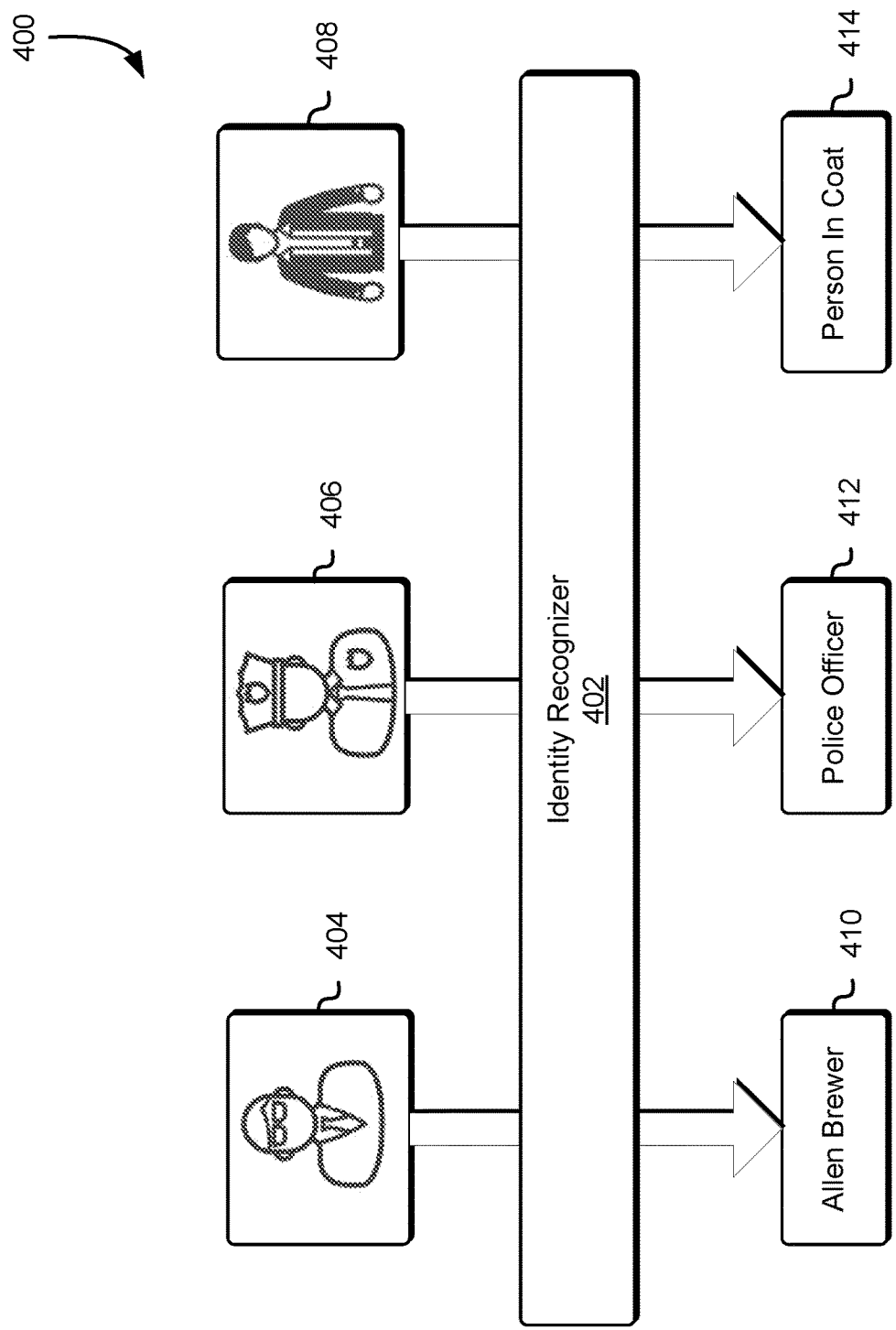
FIG. 4 shows one embodiment in which an identity recognizer generates various types of identity data.

In an embodiment, a multi-trait identifier 202 includes executable code that is executable to receive object metadata for multiple tracked objects being tracked in a video where object metadata for a tracked object includes information regarding the tracked object which further includes, for example, information regarding the direction the object is moving, the orientation of the object, and a bounding box such as those described elsewhere in connection with FIG. 4 that is used to track the object as it moves throughout the frame. In an embodiment, the multi-trait identifier 202 requests object metadata from an object detector such as those described elsewhere in connection FIG. 1 and the object detector generates object metadata 204 that includes coordinates for a bounding box around an object, the direction the object is moving, the orientation of the object (e.g., facing towards the video, facing away from the video, lateral to the video), whether the object is occluded, whether the object overlaps with another object (e.g., based on the bounding boxes tracking the objects), and more.

In an embodiment, the multi-trait identifier 202 includes executable code that is executable to receive multimedia content 206 which is obtained from various sources such as from a file of a recorded video, from a multimedia stream (e.g., video content is being provided in multimedia segments over time), from a content delivery network (CDN), and more. In an embodiment, the multimedia content 206 includes video and audio components. In an embodiment, the multimedia content has frames of video that can be played back at a particular frame rate, is recorded at a particular frame rate, which is in accordance with various standardized formats such as National Television Standards Committee (NTSC) and Phase Alternating Line (PAL).

In an embodiment, a system such as the multi-trait identifier 202 includes executable code that is executable to detect a tracked object 208 by inspecting object metadata that is received and determining a state of the tracked object, such as whether the object is a newly detected object (e.g., the object was not visible or tracked based on previous metadata received). In an embodiment, the multi-trait identifier 202 includes executable code that is executable to detect a tracked object 208 by inspecting receiving object metadata (which is provided by an object detector in the form of a list) and determining, based on the received metadata and association data maintained by the multi-trait identifier 202 (e.g., via a mapping or other suitable data structure), that a particular tracked object should be identified—this is due to the object being a newly detected object having no associated identity and/or no previously associated identity.

In an embodiment, the multi-trait identifier 202 includes executable code that is executable to, in response to detecting the tracked object, select 210 one or more frames of multimedia content 206 based on various factors. In an embodiment, the multimedia content 206 or a portion thereof is obtained in response to detecting that a particular tracked object should be identified or re-identified, portions of the obtained multimedia content corresponding to the object metadata 204. In an embodiment, the frames of multimedia content are selected based on multiple factors including a determination of whether facial data is likely to be included in the particular frames, which is determined by identifying a bounding box around the head of the individual to be identified and determining whether the bounding box tracking the head of the individual is growing in size, shrinking in size, or relatively stable in size (e.g., the change in size of a bounding box around a head is within a small percentage change). In an embodiment, other information can be utilized to determine which frames to select, such as detecting a uniform or other common traits (so as to identify the individual to a particular group, such as a law enforcement officer or a member of a sports team).

In an embodiment, the multi-trait identifier 202 includes executable code that is executable to identify 212 the tracked object by providing the selected frames and obtain identity data regarding the tracked object, such as information pertaining to who the individual being tracked is (e.g., the name or other identifying information of an individual being tracked). In an embodiment, the multi-trait identifier 202 includes a component that performs identity recognition processes, but instead, in some cases, provides (e.g., as part of an API request) selected frames of video to a separate identity recognizer that performs identity recognition processes, such as in embodiments described elsewhere in connection with FIG. 1, and receive (e.g., in response to an API request) identity information which, furthermore, encodes a confidence score.

In an embodiment, the multi-trait identifier 202 includes executable code that is executable to obtain identity information (by determining the information using an identity recognition process, by querying an identity recognizer, etc.) and associates the tracked object to the identity information which was determined based on the object metadata. In an embodiment, the multi-trait identifier 202 maintains a mapping between tracked objects and identity information such that objects being tracked by an object detector are linked to identities which determined based on visual information obtained from the multimedia content from which the object metadata was derived. In an embodiment, the mapping further includes state information as to the state of the mapping and indicate, for example, whether no mapping exists, a mapping exists and can be utilized to determine the identity of the object as it is being tracked through subsequent frames, a mapping exists but is stale and should be re-mapped, a mapping exists but there is low confidence in the mapping and should be re-mapped, and more. In an embodiment, the mapping described herein indicates identity association information 214 which is stored in connection with the multimedia content from which it is derived.

Figure 3:
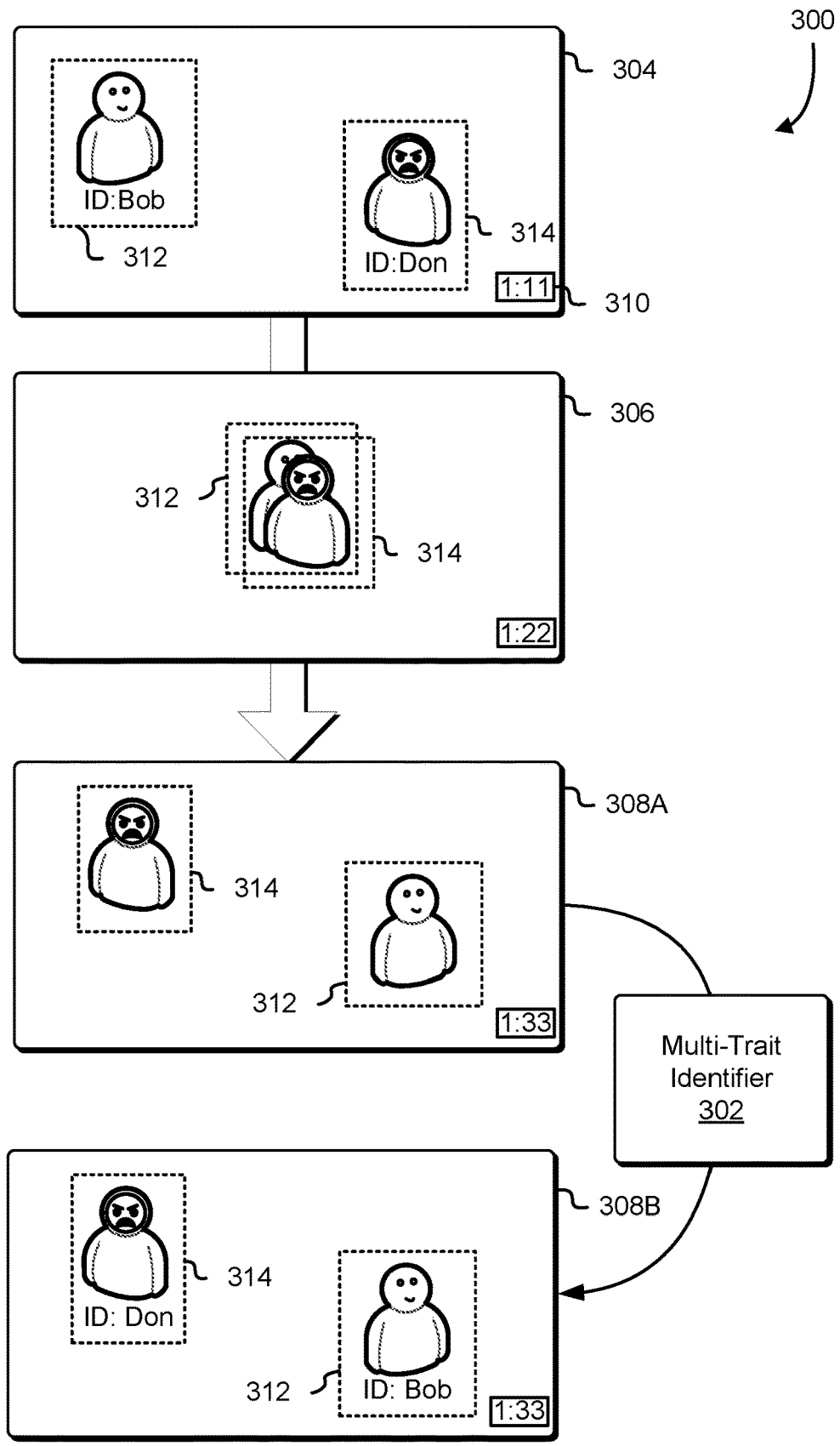
FIG. 3 shows one embodiment in which a multi-trait identifier is utilized to perform an identity recognition process.

In an embodiment, FIG. 3 is an illustrative example of a diagram 300 illustrating in which a multi-trait identifier 302 can be utilized to identify tracked objects in multimedia content. In an embodiment, the multi-trait identifier 302 shown in FIG. 3 is in accordance with those described elsewhere such as in connection with FIGS. 1 and 2. The diagram shows a first frame 304 of a video at a first point in time (as denoted by the timestamp 310 of the video shown in the lower right hand corner of the first video frame 1:11, and subsequent frames at later times), a second frame 306 of the video at a second point in time (i.e., at 1:22 in the video, eleven seconds after the first frame 304), a third frame 308A of the video at a third point in time, and the third frame 308B of the video after a multi-trait identifier 302 performs one or more processes relating to associating objects of the video to identities.

In an embodiment, the diagram 300 illustrates how a multi-trait identifier 302 can be utilized to identify tracked object in multimedia content such as a video having multiple tracked objects. In an embodiment, at a first frame 304 of a video, a first object 312 and a second object 314 is visible and may have been previously tracked and selectively identified, such as in accordance with the techniques described elsewhere in connection with FIGS. 1 and 2. In an embodiment, association data between a tracked object and identity information is generated and maintained which includes, for example, metadata such as a confidence score corresponding to the strength of the association, an association state that indicates whether an association exists, and other data that can be utilized to evaluate whether an object is substantially identifiable as well as evaluate whether a recognition process should be performed by monitoring object tracking metadata, determining a confidence score or an association state, determining that the confidence score or the association state changed based on received metadata that causes the confidence score to fall below a threshold score or an association state to change to a state which indicates an identity recognition process should be performed, performing an identity recognition process such as in the manner described elsewhere in this disclosure (e.g., in connection with FIGS. 1, 2, and 6), and generating new (i.e., updated) identity association data based at least in part on identity data generated by the identity recognition process.

Figure 6:
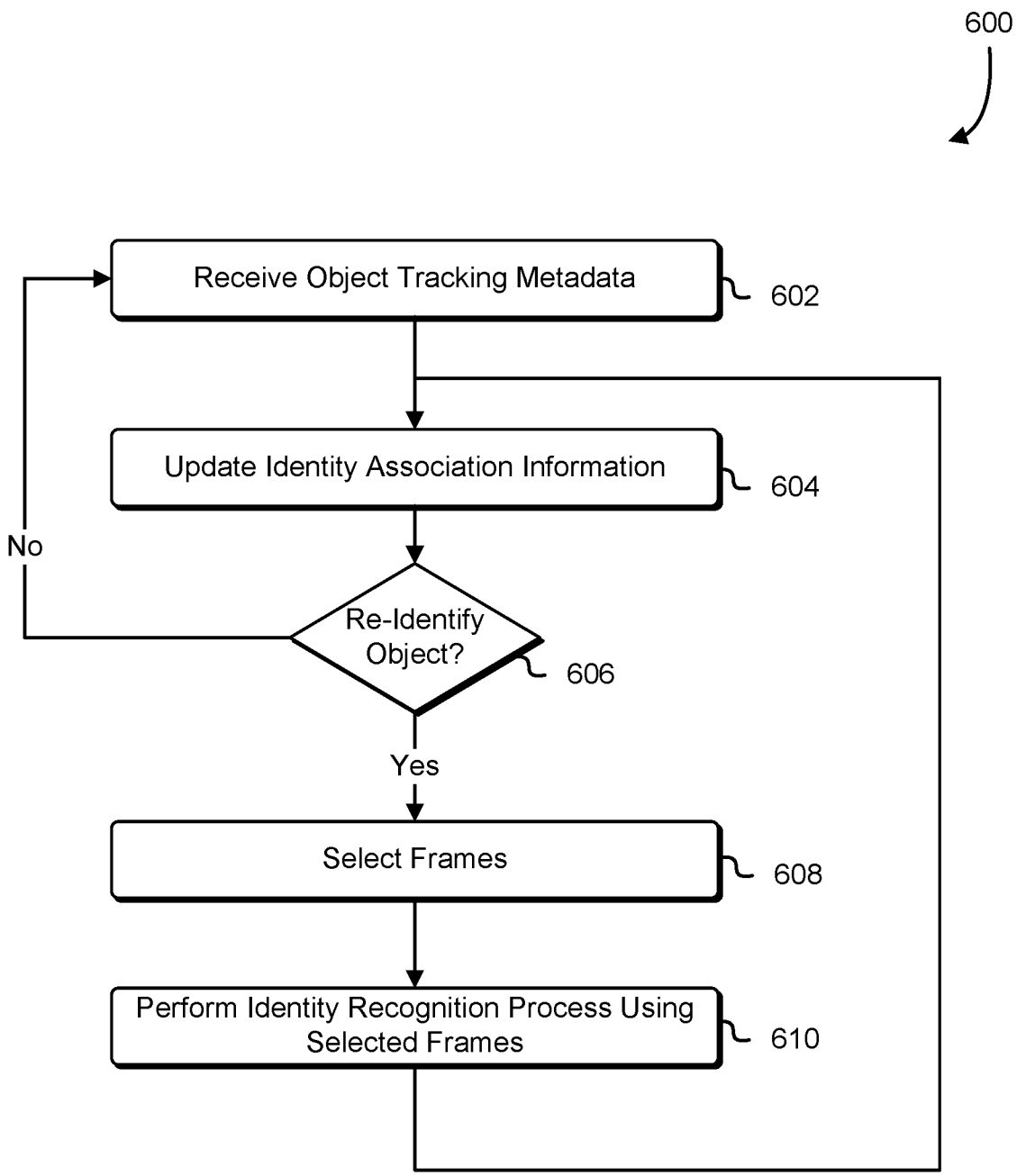
FIG. 6 shows one embodiment of a process for selectively performing an identity recognition process based on object tracking metadata.

In an embodiment, a video includes multiple objects that are tracked and associated with identities which is included in identity association data which is tracked over the time of the video (e.g., by a multi-trait identifier) such as the example shown in FIG. 3 where, at a first frame 304 of the video, a first tracked object 312 has been identified as a particular individual (e.g., the individual "Bob" shown in FIG. 3, which is the identity of a particular person having a first name "Bob" as well as additional information that disambiguates as between multiple individuals having the same first name which is not shown in FIG. 3 as for clarity of the illustration which is to show that the first tracked object 312 and the second tracked object 314 are two different individuals) and a second tracked object 314 has been identified as a different individual using any suitable technique for identity recognition and association such as those described in connection with FIGS. 1, 2, and 6. In an embodiment, object tracking metadata and/or identity association metadata includes additional data such as the absolute and/or relative velocity of the tracked objects as well as information regarding actions that the tracked objects are performing, which may be determined using various techniques that utilize Kalman filtering, Hidden Markov Models, and other algorithms that may be utilized in connection with machine learning.

In an embodiment, the individuals of the first tracked object 312 and the second tracked object 314 of the first frame 304 are moving towards each other (i.e., the first tracked object 312 is moving left-to-right and the second tracked object 314 is moving right-to-left from the perspective of the video) such that, at a second frame 306 that is at a later time than the first frame 304, the individuals cross paths, the bounding boxes associated with the individuals overlap, which causes a decrease in a confidence score that is tracked as part of the identity association metadata for one or both of the individuals (e.g., the confidence score of the first individual 312, whose face is partially occluded in the second frame 306 has a confidence score that decreases more than the decrease of the individual who is closer in the frame and not occluded). In an embodiment, when a tracked object is occluded and/or overlaps with another object (e.g., as determined based on the dimensions of the bounding box tracking the object or objects), identity association information is updated in a manner where the confidence score decreases (thereby indicating that there is less confidence in the association between the tracked object and the identity) and/or a state change occurs (e.g., a transition from a strong confidence state to a low confidence state) such that there is no longer a strong enough confidence that the tracked objects are still associated to the same individual, such as in the second frame 306 where the confidence of disambiguating between the two overlapping individuals is too low as to make a determination of the identities, thereby causing identity association to be broken, which is accomplished through a change in state, a decreasing of a confidence score, or an updating of an association mapping such as through deleting a mapping of a tracked object to an identity. In an embodiment, the multi-trait identifier 302 determines that frame 306 is not a suitable frame to provide to perform an identity recognition process based at least in part on detecting that two tracked objects overlap (e.g., by determining that the bounding boxes for the objects overlap).

In an embodiment, at some time after identity association of the tracked objects has been updated as a result of an event (e.g., two tracked objects crossing paths and/or occlusion of one or more tracked objects), a system such as the multi-trait identifier 302 shown in FIG. 3 selects a frame to be used as part of an identity recognition process, such as the third frame 308A shown in FIG. 3 (it should be noted that the frames 308A and 308B are both derived from the same multimedia content, as denoted by the frames 308A and 308B sharing the same timestamp of 1:33, and that frame 308B includes metadata that is derived from the frame 308A in conjunction with one or more other frames with the use of a multi-trait identifier 302 that is used to perform identity recognition and association processes) and provide one or more selected frames (e.g., where the one or more selected frames includes the third frame 308A or other frames in which the first tracked object 312 and the second tracked object 314 are no longer overlapping and/or occluded) to be used by the multi-trait identifier 302 as part of identity recognition and association processes where the multi-trait identifier 302 can provide the one or more selected frames to an identity recognizer or service and receive identity information regarding one or more tracked objects included in the frames and perform an association between the tracked objects to the provided identities, perhaps by updating and maintaining a mapping of tracked objects to identity association information. In an embodiment, identity association metadata can be utilized to re-identity the first tracked object 312 and the second tracked object 314 after the objects were substantially unidentifiable in an earlier frame or that a loss in identification of the object has occurred (e.g., as a result of the objects overlapping, a third objects such as a truck blocking the view of the tracked objects, and more).

In an embodiment, FIG. 4 is an illustrative example of a diagram 400 illustrating various types of input data that can be utilized in connection with an identity recognition process (e.g., as performed by an identity recognizer 402) to generate various types of identity information. In an embodiment, the identity recognizer 402 shown in FIG. 4 is in accordance with those described elsewhere such as in connection with FIGS. 1 and 2. In an embodiment, the identity recognizer is configured to receive one or more frames of multimedia content and/or object tracking metadata generated from those frames and determine identity information for one or more tracked objects. In an embodiment, the identity recognizer 402 receives one or more frames of a first tracked individual 404 and determine, based on facial data, the identity of the first tracked individual 410 as Allen Brewer which includes additional identification information that disambiguates the person from other people having the same name (e.g., using a residence, a unique identifier or unique key value). In an embodiment, the identity data generated by the identity recognizer includes the individual's name and additional identity information such as a unique identifier and is provided to another component such as a multi-trait identifier in response to a request that provides the one or more frames of the first tracked individual 404.

In an embodiment, the identity recognizer 402 receives one or more frames of a second tracked individual 406 and determine, based on frame data that the identity of the second tracked individual 412 as a police officer which is a non-unique identifier (i.e., multiple individuals is determined to be police officers) which is based at least in part on analyzing the frame and determining that the individual is wearing a police officer's uniform based at least in part on the individual wearing a police officer's hat, a police badge, and other traits in common that are associated with police officers such as wearing shirts and pants of a particular color. In an embodiment, the identity data generated by the identity recognizer includes the non-unique grouping name (e.g., police officer) and additional identity information such as a non-unique identifier and is provided to another component such as a multi-trait identifier in response to a request that provides the one or more frames of the second tracked individual 404.

In an embodiment, the identity data that is generated by an identity recognizer 402 can have various types of identifies, such as those shown in FIG. 4—in the diagram 400, the identity recognizer is configured to generate various types of identity data, so that there is a request parameter to specify that the identity recognizer should return identity information regarding a classification of the tracked individual such that the identity recognizer determines that the one or more frames of the first tracked person 404 indicates he is an accountant (e.g., evaluating the clothing that the individual is wearing, identifying the individual as Allen Brewer and then determining that Allen Brewer is an accountant).

In an embodiment, the identity recognizer 402 includes executable code that is executable to receive one or more frames of a third tracked individual 408 and determine, based on frame data that the identity of the third tracked individual 414 as a person in a coat is a non-unique identifier that is generated at run-time and does not map to any identity of that the identity recognizer has access to (e.g., where the individual has not been categorized and indexed to an identity database, such as those described elsewhere in connection with FIG. 1) which is based at least in part on analyzing the frame and determining a distinctive piece of clothing or other indicators are likely to disambiguate between the individual and other individuals of the multimedia content. In an embodiment, the identity data generated by the identity recognizer includes the non-unique grouping name (e.g., person in a coat) and additional identity information such as a non-unique identifier which is generated dynamically (e.g., generated as part of a request to determine the identity of the person being tracked in a set of provided frames).

Figure 5:
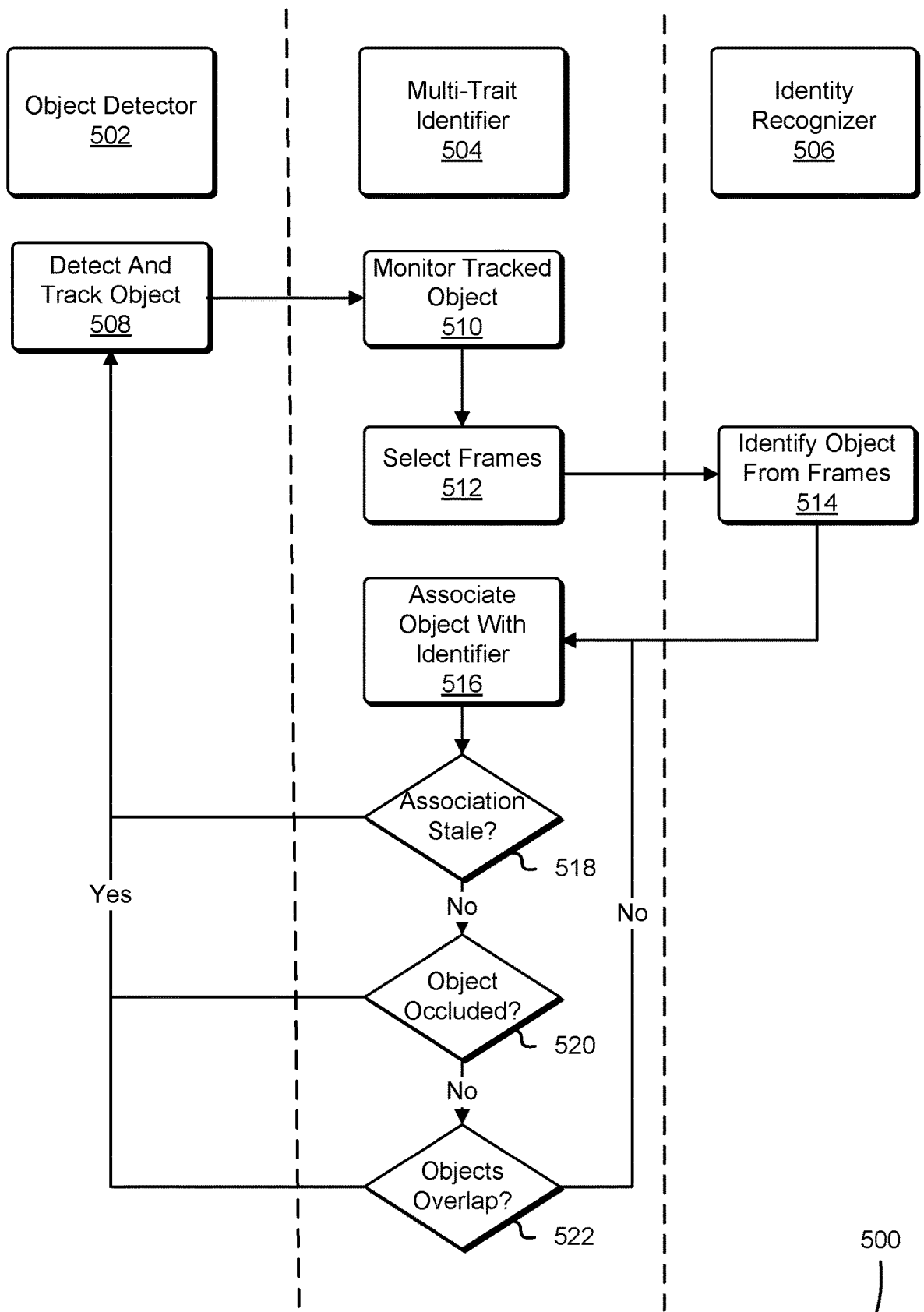
FIG. 5 shows one embodiment of a swim diagram in which an object tracker, a multi-trait identifier, and an identity recognizer coordinate the monitoring and association of identity data with tracked objects.

In an embodiment, FIG. 5 is an illustrative example of a swim diagram 500 illustrating the interactions between an object detector 502, a multi-trait identifier 504, and an identity recognizer 506 in connection with generating identity association metadata for a tracked object. In an embodiment, the object detector 502, the multi-trait identifier 504, and he identity recognizer 506 shown in FIG. 5 are in accordance with those described elsewhere such as in connection with FIGS. 1-4. In an embodiment, In an embodiment, an object detector 502 includes executable code that is executable to obtain multimedia content (e.g., from a multimedia video file) and, for at least a portion of the multimedia content, detect and track 508 objects in the video using techniques described elsewhere in this disclosure, such as in connection with FIGS. 1 and 6, and generate object tracking metadata which is encoded as metadata that extends the multimedia content (e.g., the object tracking metadata can be stored as extension data such as in a file or in the extension of a multimedia standard) and is provided to the multi-trait identifier 504. In an embodiment, the multi-trait identifier 504 receives object tracking metadata for at least some frames of video content and monitors the tracked objects 510, which includes maintaining confidence scores and/or association states for tracked objects. In an embodiment, in response to determining a confidence score falls below a threshold score or a change to an association state, the multi-trait identifier 504 selects 512 one or more frames to be used in an identity recognition process, the frames are selected by inspecting object tracking metadata and determining that facial data or other identifying information are present in the selected frames, and provide the selected frames to an identity recognizer 506. In an embodiment, the identity recognizer 506 identities 514 the object from the provided frames using an identity recognition process using technique described elsewhere such as in connection with FIG. 4 and provide identity data to the multi-trait identifier 504 (e.g., in response to a request that provides the selected frames) that may include a unique identifier, a non-unique identifier, and identifiers that are dynamically generated which may furthermore be unique or non-unique.

In an embodiment, the multi-trait identifier 504 includes executable code that is executable to receive identity data from the identity recognizer 506 and associates 516 the identity data to a tracked object in accordance with various embodiments such as those described in connection with FIGS. 1 and 2, the association includes updating a confidence score and/or association state for one or more tracked objects for which new or update identity information is generated for. The associations is maintained and monitored over time and updated based on various conditions being satisfied such as if the association becomes stale 518 (e.g., based on an identity recognition process not having been performed for a predetermined period of time), the object becoming occluded 520, the object overlaps 522 with another object, or other indicators that the object is no longer be substantially identifiable such that if the object remains substantially identifiable (e.g., based on a confidence score or association state) the object remains associated with an identity, whereas if confidence score falls below a threshold or other changes occur, the multi-trait identifier determines that there is not enough confidence in the existing identity association and may, for example, query the object tracker 502 for additional or updated object tracking metadata which is utilized to perform an identity association as discussed earlier.

In an embodiment, FIG. 6 shows an illustrative example of a process 600 for selectively performing an identity recognition process based on object tracking metadata which is implemented using hardware, software, or a combination thereof which, for example, is implemented by a multi-trait identifier in accordance with those described elsewhere in this disclosure, such as in connection with FIGS. 1-3 and 5. In an embodiment, a system such as a multi-trait identifier described in connection with FIG. 1 receives 602 object tracking metadata which includes data regarding the location of the tracked object (e.g., data such as coordinates for a bounding box around the object), the direction and velocity of the tracked object, whether the object is partially or wholly occluded, and other metadata that is usable to determine a confidence score of an identity associated to the object, evaluate an association state, or otherwise determine an identity of the object (e.g., the name of a person), such as described elsewhere in connection with other figures. In an embodiment, the system determines whether there is an identity association data entry associated with the tracked object by querying a mapping (e.g., an unordered map having key values that associate a tracked object to identity data) and if there is no identity data associated with the tracked object, identifies the object such as in the manner described later in connection with this figure, whereas if there does exist identity data associated with the tracked object, the identity association information is updated 604, for example by evaluating a confidence score or an association state such as in the manner described elsewhere in this disclosure.

In an embodiment, the system includes executable code that is executable to determine whether 606 to re-identify the tracked object based by evaluating received object metadata and perhaps additional data such as previously received object metadata (e.g., object metadata is weighted based on temporal recency) which is used to generate a confidence score, determine association state, or otherwise determine an identity of the object as discussed above. In an embodiment, a confidence score that is below a threshold value indicates that an object should be re-identified or a change to a particular association state (e.g., stale state, overlap state, occluded state) indicates that an object is substantially unidentifiable or that a loss in identification of the object has occurred, and that an identity recognition process should be performed. In an embodiment, if the system detects a loss of identification of the object being tracked (e.g., a person moving through a portion of video content) determines that a recognition should be performed, the system select one or more frames of multimedia content from multimedia that the object tracking metadata is derived from. In an embodiment, the frames of multimedia content are selected 608 based on multiple factors including a determination of whether facial data is likely to be included in the particular frames, which is determined by identifying a bounding box around the head of the individual to be identified and determining whether the bounding box tracking the head of the individual is growing in size, shrinking in size, or relatively stable in size (e.g., the change in size of a bounding box around a head is within a small percentage change). In an embodiment, other information can be utilized to determine which frames to select, such as detecting a uniform (so as to identify the individual to a particular group, such as a law enforcement officer or a member of a sports team).

In an embodiment, the system includes executable code that is executable to identify the tracked object by performing 610 an identity recognition process or delegate the performance of the identity recognition process to another component by providing the selected frames and obtain identity data regarding the tracked object, such as information pertaining to who the individual being tracked is (e.g., the name or other identifying information of an individual being tracked) to perform identity recognition processes that are in accordance with those described elsewhere in this disclosure, such as in connection with FIGS. 1 and 2.

Figure 7:
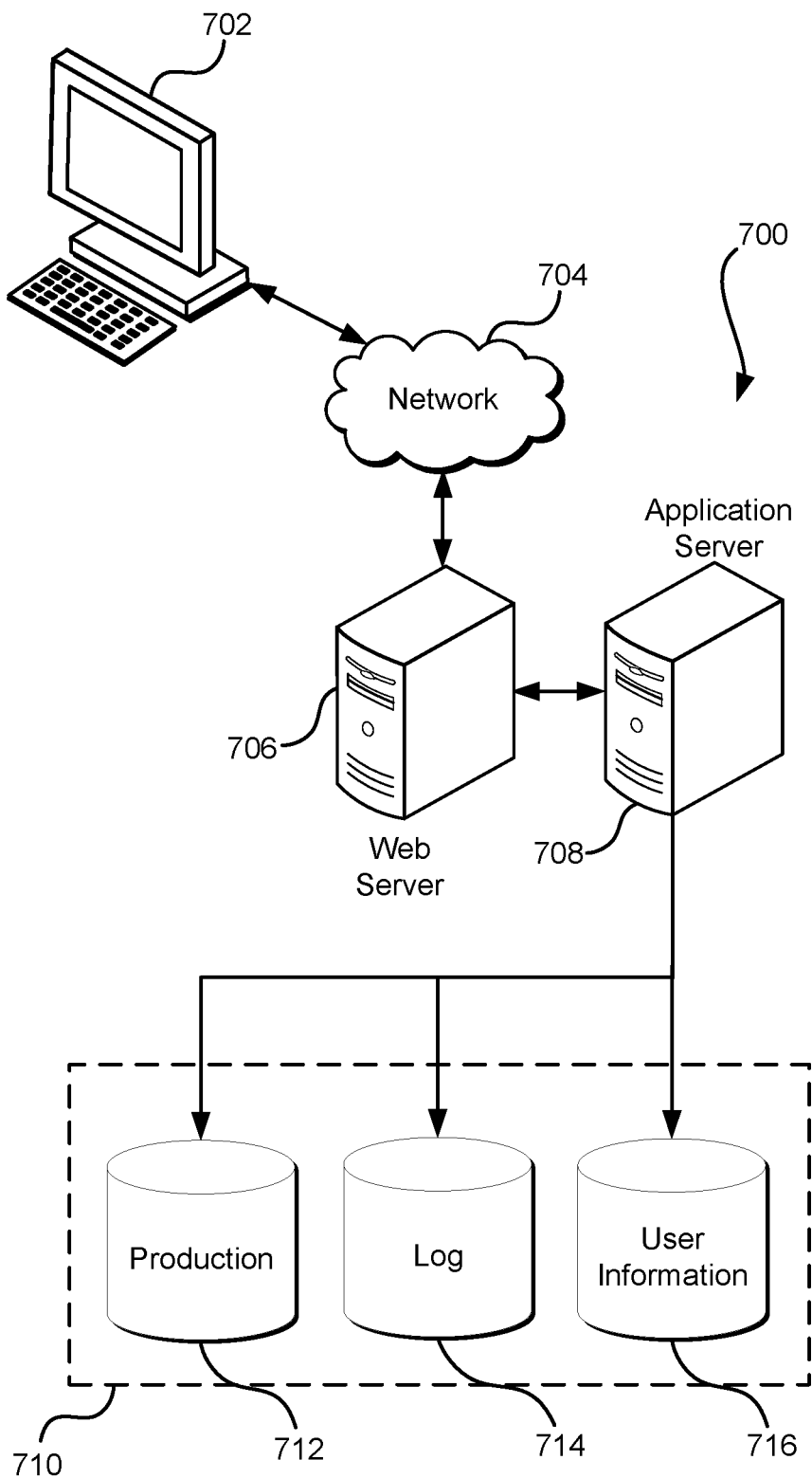
FIG. 7 illustrates a system in which various embodiments can be implemented.

FIG. 7 illustrates aspects of an example system 700 for implementing aspects in accordance with various embodiments. As will be appreciated, although a web-based system is used for purposes of explanation, different systems may be used, as appropriate, to implement various embodiments. The system includes an electronic client device 702, which can include any appropriate device operable to send and/or receive requests, messages, or information over an appropriate network 704 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or system selected. Many protocols and components for communicating via such a network are well known and will not be discussed herein in detail. Communication over the network can be enabled by wired or wireless connections and combinations thereof. In this example, the network includes the Internet and/or other publicly-addressable communications network, as the system includes a web server 706 for receiving requests and serving content in response thereto, although for other networks an alternative device serving a similar purpose could be used as would be apparent to one of ordinary skill in the art.

The illustrative system includes at least one application server 708 and a data store 710. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CS S"), JavaScript Object Notation (JSON), and/or another appropriate client-side structured language. Content transferred to a client device may be processed by the client device to provide the content in one or more forms including, but not limited to, forms that are perceptible to the user audibly, visually and/or through other senses. The handling of all requests and responses, as well as the delivery of content between the client device 702 and the application server 708, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 710 can include several separate data tables, databases, data documents, dynamic data storage schemes and/or other data storage mechanisms and media for storing data relating to a particular aspect of the present disclosure. For example, the data store illustrated may include mechanisms for storing production data 712 and user information 716, which can be used to serve content for the production side. The data store also is shown to include a mechanism for storing log data 714, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 710. The data store 710 is operable, through logic associated therewith, to receive instructions from the application server 708 and obtain, update or otherwise process data in response thereto. The application server 708 may provide static, dynamic, or a combination of static and dynamic data in response to the received instructions. Dynamic data, such as data used in web logs (blogs), shopping applications, news services, and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 702. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The system, in one embodiment, is a distributed and/or virtual computing system utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the system 700 in FIG. 7 should be taken as being illustrative in nature and not limiting to the scope of the disclosure.

The various embodiments further can be implemented in a wide variety of operating systems, which in some cases can include one or more user computers, computing devices or processing devices which can be used to operate any of a number of applications. User or client devices can include any of a number of computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The system can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad) and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:
1. A computer-implemented method, comprising:
tracking a plurality of objects over a first plurality of images of a video;
obtaining object tracking metadata determined based on the tracking of a first object, the object tracking metadata indicating facial data and an identifier of the first object in the first plurality of images;
identifying, based at least in part on the object tracking metadata, a person in a first image selected from the first plurality of images, wherein the first image is selected based at least in part on the object tracking metadata indicating a movement of the first object in the plurality of images;
detecting a loss of identification of the person, based at least on a second identified object overlapping the first object within a set of the first plurality of images;
tracking the identified second object over a second plurality of images of the video; and
determining, as a result of detecting an additional object in the second plurality of images, whether the person identified in the first image is the same as the additional object in the second image, wherein the determining includes identifying a face of the person.

2. The computer-implemented method of claim 1, wherein identifying the face of the person comprises detecting the face in a portion of the video subsequent to tracking the second object and determining the person is associated to the identifier based at least in part on a classification derived from the portion of the video.

3. The computer-implemented method of claim 1, wherein identifying the face of the person further comprises selecting one or more frames of the portion of the video based at least in part on determining, based at least in part on the facial data, that at least a portion of the face is visible in the selected frames.

4. The computer-implemented method of claim 1, wherein detecting the loss of identification of the person is based at least in part on detecting the person is at least partially occluded.

5. A system, comprising:
one or more machine-readable mediums having stored thereon a set of instructions, which if performed by one or more processors, cause the system to at least:
track a plurality of objects over a first plurality of frames of a video content;
obtain object tracking metadata determined based on [[the ]]a first object tracked, the object tracking metadata including facial data and corresponding one or more identities;
identify, based at least in part on the object tracking metadata, a person in a portion of the first plurality of frames of the video, the portion of the first plurality of images selected to identify the person based at least in part on the object tracking metadata indicating a movement of the first object within the portion;
detect the person is no longer substantially identifiable, based at least on a second identified object overlapping the first object within a set of the first plurality of images; and
identify an additional object in a subsequent frame of the video content matches the first object identified as the person as a result of the first object no longer being substantially identifiable.

6. The system of claim 5, wherein the instructions that, if performed by the one or more processors, cause the system to identify the first object in the first plurality of frames of the video content further comprise instructions that:

select the first frame based at least in part on object metadata associated with the first frame that indicates facial data of the object is visible in the first frame;

request recognition of the first object based at least in part on the first frame; and obtain, in connection with the request, identity data associated with the first object.

7. The system of claim 6, wherein the instructions that, if performed by the one or more processors, cause the system to select the first frame of the video content from a plurality of frames further comprise instructions that:

determine a first size of a bounding box around a head of the first object at the first frame of the video content;

determine a second size of the bounding box around the head of the first object at another frame of the video content; and determine, a growth in a size of the bounding box over time.

8. The system of claim 5, wherein the set of instructions, which if performed by one or more processors, further cause the system to at least generate a confidence score or an association state based at least in part on object tracking metadata associated with the first frame of the video content, the confidence score or the association state usable to determine whether the first object is substantially identifiable.

9. The system of claim 5, wherein the set of instructions, which if performed by one or more processors, further cause the system to at least track the first object through at least a plurality of frames from the first frame to the subsequent frame.

10. The system of claim 5, wherein the instructions that, if performed by the one or more processors, cause the system to identify the second object in the subsequent frame of the video content as a result of the first object no longer being substantially identifiable comprise instructions that determine the first object is no longer substantially identifiable based at least in part on one or more frames between the first frame and the subsequent frame that indicate that the first object overlaps with another object.

11. The system of claim 5, wherein the set of instructions, which if performed by one or more processors, further cause the system to:

obtain a first object tracking metadata for a second frame of the video content between the first frame and the subsequent frame, encoding a first bounding box indicating coordinates of the first object;

obtain a second object tracking metadata for the second frame, encoding a second bounding box indicating coordinate of another object; and determine the first object is no longer substantially identifiable based at least in part on calculating an overlap between the first bounding box and the second bounding box.

12. The system of claim 5, wherein the set of instructions, which if performed by one or more processors, further cause the system to:

obtain a first object tracking metadata for the subsequent frame, encoding a first bounding box indicating coordinates of the first object;

obtain a second object tracking metadata for the subsequent frame, encoding a second bounding box indicating coordinates of another object;

determine no overlap between the first bounding box and the second bounding box; and identify the second object in the subsequent frame in response to having determined no overlap between the first bounding box and the second bounding box.

13. A non-transitory computer-readable storage medium having stored thereon executable instructions that, as a result of being executed by one or more processors of a computer system, cause the computer system to at least:

track a plurality of objects over a first plurality of frames of a video content;

obtain object tracking metadata determined based on a first object tracked, the object tracking metadata including information indicative of movement of the first object and indicating whether facial data of the first object corresponds to an identity of a set of identities is included in the first plurality of frames;

identify, based at least in part on the object tracking metadata, a person in the first plurality of frames of the video content;

track a second object through a second plurality of frames of the video content;

detect a loss of identification of the person, based at least on a second identified object occluding the first object within a set of the first plurality of images; and identify an additional object in a second frame of the second plurality of frames as matching the person as a result of the first object being no longer substantially identifiable and based at least in part on movement of the second object.

14. The non-transitory computer-readable storage medium of claim 13, wherein the executable instructions that, as a result of being executed, cause the system to identify the first frame of the video content further comprise executable instructions that:

obtain a second plurality of frames of the video content, the second plurality of frames having corresponding object tracking metadata that includes location information of the first object within the first plurality of frames;

select at least one frame of the second plurality of frames, the at least one frame comprising the first frame including facial data;

determine identity data of the second object based at least in part on the at least one frame; and associate the identity data to the second object tracking metadata.

15. The non-transitory computer-readable storage medium of claim 14, wherein the object tracking metadata comprises coordinates of a first bounding box for the tracked second object.

16. The non-transitory computer-readable storage medium of claim 15, wherein the executable instructions that, as a result of being executed, cause the system to determine identity data of the second object comprise executable instructs that:

determine a second bounding box within the first bounding box that includes a head;

obtain facial data of the second object based on a frame associated with the second object tracking metadata; and compare the facial data against a plurality of known identities having respective identity data.

17. The non-transitory computer-readable storage medium of claim 14, wherein the identity data comprises a non-unique identifier wherein multiple objects are associated to the non-unique identifier based on one or more common clothing items.

18. The non-transitory computer-readable storage medium of claim 13, wherein the executable instructions that, as a result of being executed, cause the system to track the first object through the first plurality of frames further comprise executable instructions that:
  obtain object tracking metadata for the first plurality of frames, a respective object tracking metadata of a frame of the first plurality of frames includes location information of the object within the frame; and
  determine a confidence score based at least in part on the respective object tracking metadata.

19. The non-transitory computer-readable storage medium of claim 18, wherein the confidence score is based at least in part on an indication included in the first object tracking metadata whether the first object is occluded.

20. The non-transitory computer-readable storage medium of claim 18, wherein the executable instructions that, as a result of being executed, cause the system to identify the first object is no longer substantially identifiable further comprise executable instructions that compare the confidence score against a threshold score.

\* \* \* \* \*